(No Model.)
M. MONEYMENT.
METHOD OF DECORATING WALLS, &c.
No. 291,215. Patented Jan. 1, 1884.
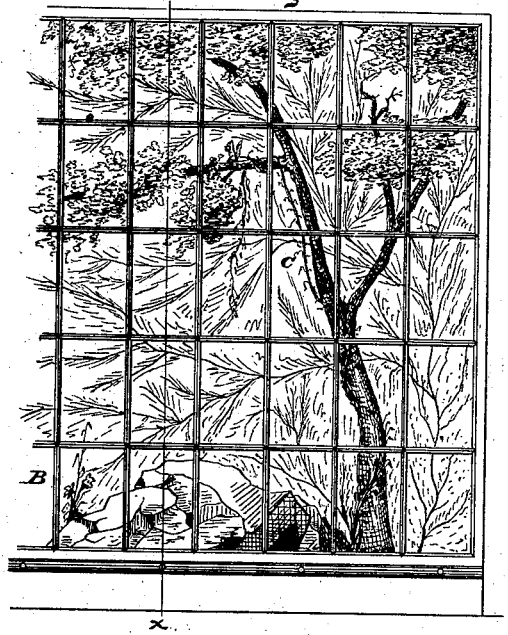
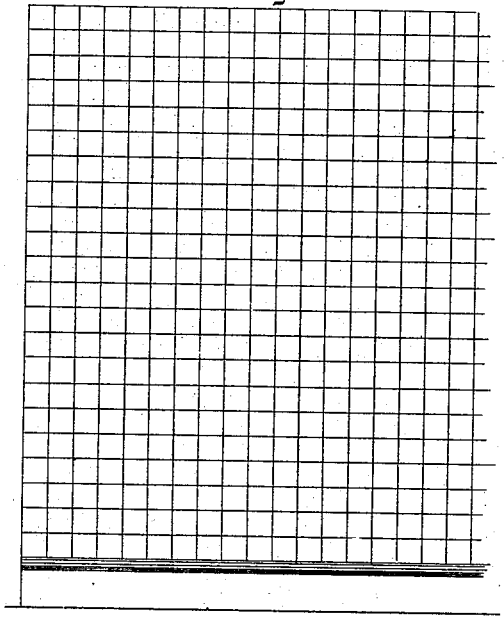
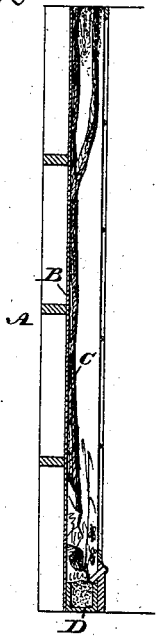
WITNESSES:
INVENTOR:
Matthew Moneyment,
BY John A. Siedersheim
ATTORNEY.

UNITED STATES PATENT OFFICE.

MATTHEW MONEYMENT, OF PHILADELPHIA, PENNSYLVANIA.

METHOD OF DECORATING WALLS, &c.

SPECIFICATION forming part of Letters Patent No. 291,215, dated January 1, 1884.

Application filed November 16, 1883. (No model.)

*To all whom it may concern:*

Be it known that I, MATTHEW MONEYMENT, a citizen of the United States, residing in the city and county of Philadelphia, State of Pennsylvania, have invented a new and useful Improvement in Decorating Walls, Ceilings, &c., which improvement is fully set forth in the following specification and accompanying drawings, in which—

Figure 1 represents a face view of decorations for walls, ceilings, &c., embodying my invention. Fig. 2 represents a modification of the covering thereof. Fig. 3 is a vertical section thereof in line $x\ x$, Fig. 1.

Similar letters of reference indicate corresponding parts in the several figures.

My invention consists of a new method of and means for decorating walls, ceilings, &c., as will be hereinafter set forth.

Referring to the drawings, A represents the studding or outer wall of an apartment to be decorated.

B represents the inner wall of the apartment, the same being employed in lieu of plastering, and occupying the space of the plastering and lathing, consisting of artificial trees, vines, shrubs, flowers, grasses, &c., as at C, which are gracefully arranged and placed sufficiently close or built up to form a comparatively solid wall. The face of the prepared wall is covered with glass, wire-gauze, or other suitable material of a transparent nature, thus protecting the wall and preserving its compactness, without, however, obscuring the view thereof.

It is evident that representations of mountains, landscapes, houses, people, and animals, and rocks, caves, running streams of water, &c., may be interposed among the trees, &c., so as to produce the appearance of scenery of city and country, with novel and beautiful effect. Provision may also be made for the lodgment of birds, &c., among the trees, &c., and the streams may be stocked with fish.

The trees, &c., may rest in troughs D, placed on the floor of the apartment, and where living trees, vines, flowers, shrubs, grasses, &c., are employed said troughs may be filled with earth and supplied with water through proper openings in the wash-boards, the latter being employed to conceal the troughs and finish the bottom of the walls.

Ceilings of apartments may be decorated similar to the walls with transparent or open-work coverings, which will prevent the decorations from falling.

The invention is applicable to doors, stairways, furniture, &c.

Having thus described my invention, what I claim as new, and desire to secure by Letters Patent, is—

1. A decoration for walls, &c., employed in lieu of plastering, consisting of trees, vines, &c., harmoniously disposed in the space occupied by the plastering, substantially as and for the purpose set forth.

2. A decoration for walls, &c., employed in lieu of plastering, consisting of trees, vines, &c., occupying the space of the plastering, and having a transparent covering, substantially as and for the purpose set forth.

3. A decoration for walls, &c., employed in lieu of plastering, consisting of trees, vines, &c., occupying the space of plastering, and having a transparent covering, in combination with a bottom trough, substantially as and for the purpose set forth.

MATTHEW MONEYMENT.

Witnesses:
JOHN A. WIEDERSHEIM,
A. P. GRANT.